(12) United States Patent
DeMaria et al.

(10) Patent No.: US 8,848,758 B2
(45) Date of Patent: *Sep. 30, 2014

(54) WAVEGUIDE $CO_2$ LASER WITH MULTIPLY FOLDED RESONATOR

(71) Applicant: Coherent, Inc., Santa Clara, CA (US)

(72) Inventors: Anthony J. DeMaria, West Suffield, CT (US); R. Russel Austin, La Veta, CO (US)

(73) Assignee: Coherent, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,087

(22) Filed: Nov. 11, 2013

(65) Prior Publication Data

US 2014/0064318 A1      Mar. 6, 2014

Related U.S. Application Data

(63) Continuation of application No. 13/100,198, filed on May 3, 2011, now Pat. No. 8,611,391.

(51) Int. Cl.
| | |
|---|---|
| *H01S 3/03* | (2006.01) |
| *H01S 3/223* | (2006.01) |
| *H01S 3/036* | (2006.01) |
| *H01S 3/038* | (2006.01) |
| *H01S 3/081* | (2006.01) |
| *H01S 3/0975* | (2006.01) |

(52) U.S. Cl.
CPC ............... *H01S 3/038* (2013.01); *H01S 3/2232* (2013.01); *H01S 3/036* (2013.01); *H01S 3/0315* (2013.01); *H01S 3/0816* (2013.01); *H01S 3/0385* (2013.01); *H01S 3/0975* (2013.01); *H01S 3/0305* (2013.01)
USPC .................. 372/61; 372/55; 372/62; 372/64; 372/65

(58) Field of Classification Search
CPC ..... H01S 3/0305; H01S 3/0315; H01S 3/036; H01S 3/0816; H01S 3/0975; H01S 3/2232; H01S 3/0385
USPC .................................... 372/55, 61, 62, 64, 65
See application file for complete search history.

(56) References Cited

U.S. PATENT DOCUMENTS

| | | | |
|---|---|---|---|
| 3,386,043 A | 5/1968 | Marcatili et al. | |
| 3,772,611 A | 11/1973 | Smith | |

(Continued)

FOREIGN PATENT DOCUMENTS

| | | |
|---|---|---|
| CN | 100389526 C | 5/2008 |
| GB | 2182483 A | 5/1987 |
| WO | 02/05396 A1 | 1/2002 |

OTHER PUBLICATIONS

International Preliminary Report on Patentability received for PCT Patent Application No. PCT/US2012/034713, mailed on Nov. 14, 2013, 12 pages.

(Continued)

*Primary Examiner* — Yuanda Zhang
(74) *Attorney, Agent, or Firm* — Morrison & Foerster LLP

(57) ABSTRACT

A gas-discharge waveguide $CO_2$ laser has a Z-shaped folded waveguide formed by three ceramic tubes. Ends of the adjacent tubes are shaped and fitted together to form a common aperture. The tubes are held fitted together by spaced-apart parallel discharge electrodes. Four minors are arranged to form a laser-resonator having a longitudinal axis extending through the tubes.

16 Claims, 5 Drawing Sheets

(56) References Cited

U.S. PATENT DOCUMENTS

| | | | |
|---|---|---|---|
| 3,961,283 | A | 6/1976 | Abrams et al. |
| 4,596,018 | A | 6/1986 | Gruber et al. |
| 4,779,286 | A | 10/1988 | Wheatley |
| 4,964,136 | A | 10/1990 | Egawa |
| 5,684,820 | A | 11/1997 | Jenkins et al. |
| 6,181,725 | B1 | 1/2001 | Schanz et al. |
| 6,192,061 | B1 | 2/2001 | Hart et al. |
| 6,798,816 | B2 | 9/2004 | DeMaria et al. |
| 6,826,204 | B2 | 11/2004 | Kennedy et al. |
| 7,260,134 | B2 | 8/2007 | Shackleton et al. |
| 7,570,683 | B1 | 8/2009 | Broderick et al. |
| 8,611,391 | B2 * | 12/2013 | DeMaria et al. ............ 372/61 |
| 2005/0018735 | A1 | 1/2005 | Jitsuno |
| 2005/0018736 | A1 | 1/2005 | Kennedy et al. |
| 2008/0144675 | A1 | 6/2008 | Spinelli et al. |
| 2009/0034574 | A1 | 2/2009 | Shackleton et al. |
| 2009/0213885 | A1 | 8/2009 | DeMaria |

OTHER PUBLICATIONS

Non Final Office Action received for U.S. Appl. No. 13/100,198, mailed on Jul. 24, 2012, 13 pages.

Final Office Action received for U.S. Appl. No. 13/100,198, mailed on Jan. 25, 2013, 11 pages.

Advisory Action received for U.S. Appl. No. 13/100,198, mailed on Mar. 26, 2013, 3 pages.

Non Final Office Action received for U.S. Appl. No. 13/100,198, mailed on Apr. 17, 2013, 10 pages.

Notice of Allowance received for U.S. Appl. No. 13/100,198, mailed on Sep. 4, 2013, 9 pages.

International Search Report and Written Opinion received for PCT Patent Application No. PCT/US2012/034713, mailed on Oct. 5, 2012, 15 pages.

DeMaria, Anthony J., "Exploring Sealed CO2 Lasers", Industrial Laser Solutions, Apr. 1999, 3 pages.

Ru et al., U.S. Appl. No. 12/859,592, filed Aug. 19, 2010, titled "Hermetically Sealed Output Coupling Mirror".

* cited by examiner

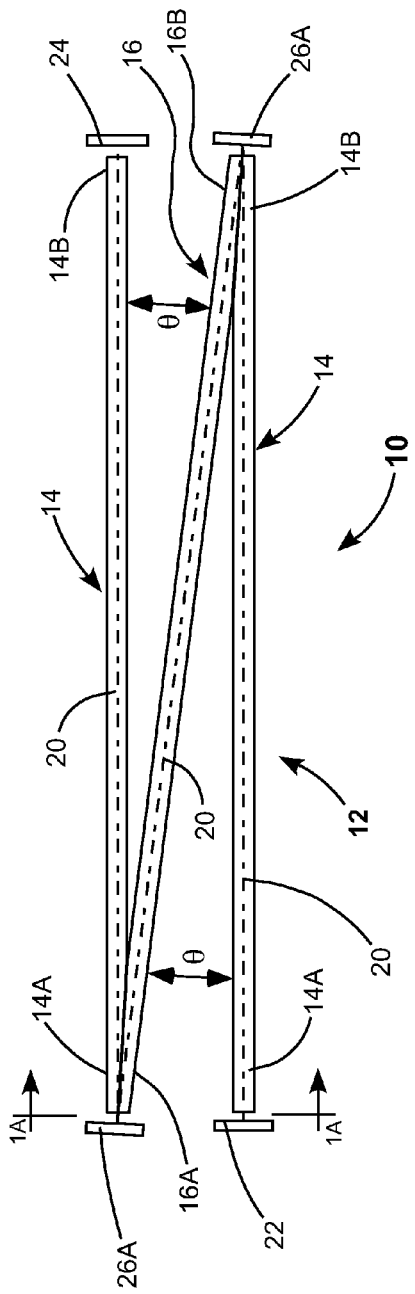
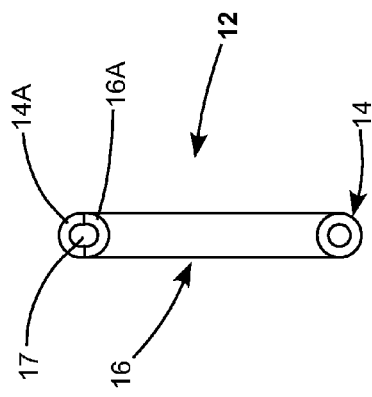
FIG. 1
FIG. 1A

US 8,848,758 B2

WAVEGUIDE CO₂ LASER WITH MULTIPLY FOLDED RESONATOR

CROSS REFERENCE

This application is a continuation of U.S. application Ser. No. 13/100,198, filed May 3, 2011, the disclosure of which is incorporated herein by reference.

TECHNICAL FIELD OF THE INVENTION

The present invention relates in general to waveguide $CO_2$ gas-discharge lasers. The invention relates in particular to $CO_2$ lasers with multiply folded resonators.

DISCUSSION OF BACKGROUND ART

Waveguide $CO_2$ gas-discharge lasers with output power of about 100 Watts (W) or lower are generally preferred for applications such as product marking, engraving and fine cutting, where high beam-quality is important. In such a laser, a lasing mode in a resonator of the laser is controlled by confining the lasing mode in mutually perpendicular, transverse axes in a dielectric waveguide. Radio frequency (RF) power, supplied to electrodes on opposite sides of the waveguide in one of the transverse axes, creates a gas-discharge in a lasing-gas mixture in the waveguide. The gas-discharge energizes the lasing gas mixture and thereby provides optical gain in the laser-resonator. The lasing-gas mixture typically is a mixture of carbon-dioxide ($CO_2$) with inert gases, such as nitrogen and helium.

For any given lasing gas mixture, and RF power applied to the electrodes, the laser-resonator will have a certain gain-per-unit-length. Because of this, power in a beam delivered from the laser is directly dependent, inter alia, on the length of the laser-resonator.

In order to confine a waveguide $CO_2$ laser within a convenient space or "footprint", the laser-resonator is typically "folded" one or more times by a plurality of mirrors. A detailed description of such folded-resonator, waveguide $CO_2$ lasers is provided in U.S. Pat. No. 6,192,061, assigned to the assignee of the present invention, and the complete disclosure of which is hereby incorporated herein by reference. A principle feature of these waveguide $CO_2$ lasers is that the correspondingly-folded waveguide is machined, by a grinding process, into a block of a ceramic material, such as alumina. This permits adjacent waveguide branches at an angle to each other to overlap at the "fold", and merge into a single aperture. One advantage of such machined waveguide branches is that the waveguide branches are held permanently in exact alignment with each other. A disadvantage of machined waveguide branches, however, is that the grinding operation is time-consuming and relatively expensive. By way of example the cost of a Z-shaped three channel waveguide can be as high as 17% of the cost of a complete laser with power-supply. Accordingly, there is a need for a comparable folded ceramic waveguide arrangement that does not require an expensive ceramic machining or grinding operation.

SUMMARY OF THE INVENTION

In one aspect of the present invention, a gas-discharge laser comprises a laser housing including a lasing gas. A plurality of ceramic tubes is located in the laser housing and filled with the lasing gas. Adjacent ones of the ceramic tubes are at an acute angle to each other, and with ends of the adjacent ones of the ceramic tubes shaped and fitted together to provide a common aperture. First and second electrodes are located in the laser housing and arranged to create a gas discharge in the lasing gas in the ceramic tubes when electrical power is applied to the electrodes. A plurality of mirrors is arranged to form a laser-resonator having a longitudinal axis extending through the plurality of ceramic tubes.

In a preferred embodiment of the invention, the electrodes are spaced apart and parallel to each other with the ceramic tubes located therebetween in corresponding grooves in the electrodes. The ceramic tubes are held fitted together by spring force urging the electrodes together.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 is a plan-view schematically illustrating a preferred embodiment of a folded-waveguide laser-resonator in accordance with the present invention wherein the folded waveguide includes a sub-assembly of three ceramic tubes.

FIG. 1A is an end-elevation view, seen generally in the direction 1A-1A of FIG. 1, schematically illustrating further detail of the ceramic-tube sub-assembly of FIG. 1.

DETAILED DESCRIPTION OF THE INVENTION

Figure 2:
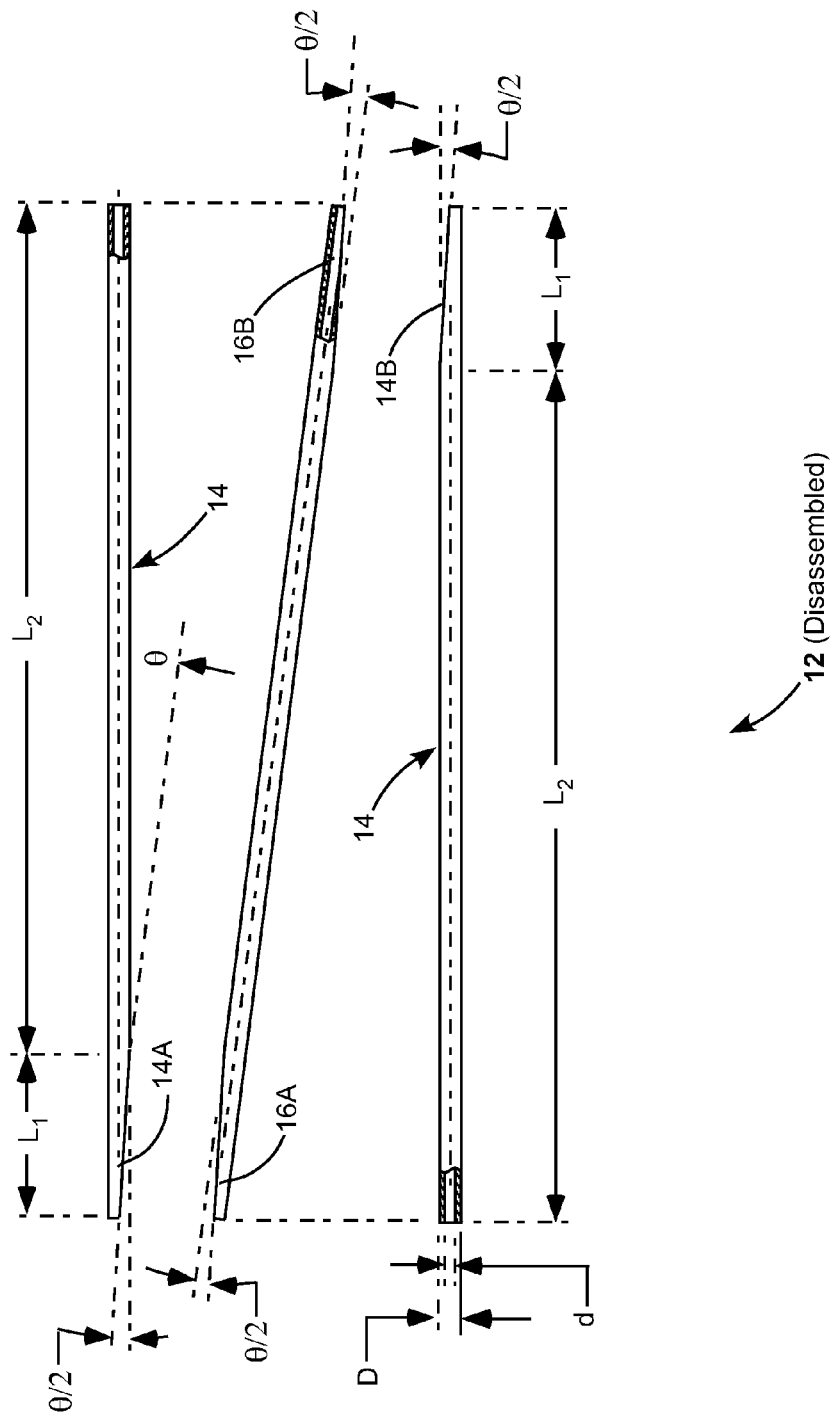
FIG. 2 is a plan view schematically illustrating detail of individual ceramic tubes of the sub-assembly of FIG. 1.

Referring now to the drawings, wherein like components are designated by like reference numerals, FIG. 1 and FIG. 1A schematically illustrates a preferred embodiment 10 of a folded waveguide-laser-resonator apparatus in accordance with the present invention. Apparatus 10 includes a sub-assembly 12 of ceramic tubes (waveguides) forming in effect a folded waveguide. In sub-assembly 12, there are two spaced-apart and parallel ceramic tubes 14 having first and second ends 14A and 14B respectively, and a transverse ceramic tube 16 having first and second ends 16A and 16B respectively.

End 16A of transverse tube 16 is in contact with (fitted with) end 14A of one ceramic tube 14, and end 16B of ceramic tube 16 is in contact with end 14B of the other ceramic tube 14 to impart a "Z"-shape to the sub-assembly with an acute angle θ between parallel ceramic tubes 14 and transverse ceramic tube 16. The contacted ends of the ceramic tubes are cut such that the tubes combine to form a common aperture 17 as depicted in 1A.

A folded laser-resonator having a longitudinal axis 20 is terminated by end-mirrors 22 and 24 and folded by fold-minors 26A and 26B. Preferably one of end minors 22 and 24 is made partially transmissive at a fundamental wavelength of the laser-resonator and serves as an output-coupling mirror. The other end-minor and the fold-minors are maximally reflective at the fundamental wavelength.

Where ends of ceramic tubes 14 and 16 are in contact (fitted together) the length of the ceramic tubes are cut back such that common aperture 17 has an elongated "waisted" form. This provides that fold minors 26A and 26B can be spaced apart from the ends of the ceramic tubes while ensuring that that resonator axis 20 is collinear with the longitudinal axis of the ceramic tubes to optimize lasing efficiency. The minor spacing is required, inter alia, to keep the minors remote from a discharge that will be excited in the ceramic tubes, and to allow for alignment of the mirrors in the resonator.

Extruded alumina capillary tubes suitable for use as ceramic tubes 14 and 16 are commercially available from OrTech Inc., of Sacramento Calif.; Sentro Tech Corp., of Berea Ohio; and Coors Tek, of Golden, Colo., among others.

FIG. 2 is a plan view schematically illustrating the ceramic-tube sub-assembly of FIG. 1 in disassembled form. In tubes 14, one end of each tube has a length $L_1$ over which the tube is beveled or chamfered at an angle $\theta/2$ to the longitudinal axis of the ceramic tube. Ceramic tube 16 is correspondingly chamfered at to provide the angle $\theta$ between the ceramic tubes when the chamfered ends thereof are in contact. The length $L_2$ is preferably the same for both ceramic tubes 14 tubes, with ceramic tube 16 having an overall length of $(L_1+L_2)/\cos\theta$, such that the ends of the ceramic tubes can be aligned in a common plane. In a manufacturing operation, beveling or chamfering the tubes can be done by batch grinding, thereby minimizing ceramic machining costs.

The overall length $L_1+L_2$ of a tube is selected to conform to a desired laser length. The number or arms (ceramic tubes) can be only two, or more than the three exemplified here, in a V-shape, Z-shape, M-shape, or some more complex shape. Typically about 12.5 W of $CO_2$ laser output power per foot of waveguide length can be obtained. The inside diameter, d, of the ceramic waveguide is selected to satisfy a small Fresnel Number $((d/2)/L\lambda)$ requirement for suppressing high order modes. In a $CO_2$ laser $\lambda$ (the wavelength of the laser-radiation) will be on the order of 10.0 micrometers ($\mu m$). A preferred value for the Fresnel number is about 0.5.

Angle $\theta$ of the waveguide sub-assembly is preferably between about 2° and 10°. A larger angle $\theta$ increases the width of the waveguide structure and the width of a corresponding housing for the assembly. A smaller angle $\theta$ increases the length $L_2$ of the overlap of ceramic tubes 14 and 16. This can lead to discharge "hot-spots" within an enlarged discharge region in the overlap region. Such discharge hot-spots can lead to reduced laser efficiency. Merging ceramic tubes 14 and 16 to form one aperture provides coupling between discharges in adjacent tubes to ensure that both discharges light at about the same time.

Figure 3:
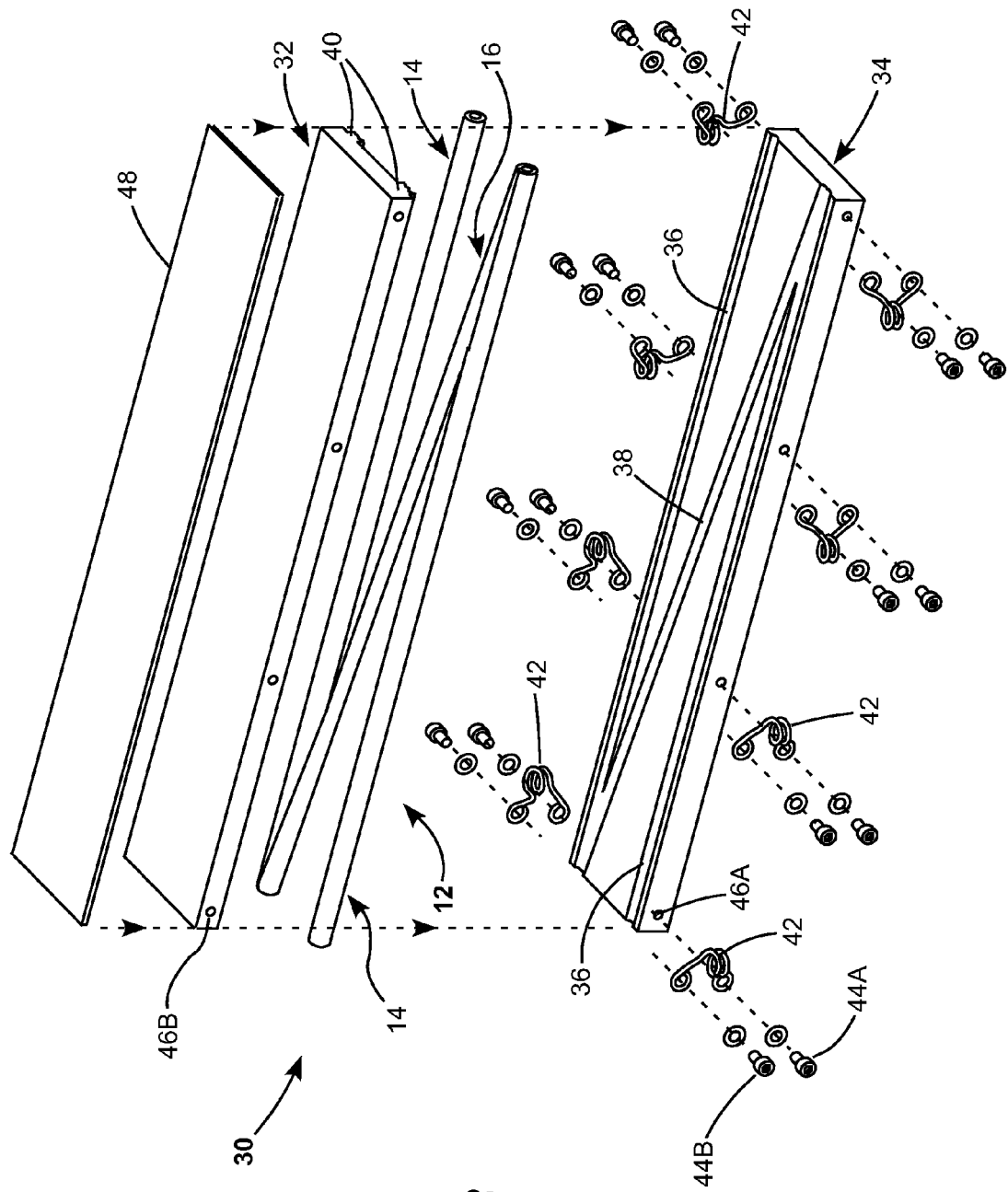
FIG. 3 is an exploded three-dimensional view schematically illustrating an assembly including the ceramic-tube sub-assembly of FIG. 1 and elongated discharge electrodes for exciting gas-discharge in the ceramic tubes, the electrodes being configured to hold the ceramic-tube sub-assembly together in the assembly.

A particular challenge in forming ceramic-tube sub-assembly 12 is that it is not practical to hold ends of ceramic tubes 14 and ceramic tube 16 in contact with an adhesive or bonding agent. One reason for this is that such an adhesive or bonding agent can "outgas" and contaminate the lasing gas mixture. Further, the above-discussed preferred dimensions of the tubes and a brittle nature of the ceramic material cause the ceramic tubes to be somewhat fragile. It was necessary to devise an assembly method that would ensure that the ceramic tubes could be positively held in contact at the beveled ends thereof; held in correct alignment with each other such that the longitudinal axes thereof could be maintained in alignment with the resonator axis; and held in a manner that would avoid the ceramic tubes being subjected to mechanic stresses which could cause flexure or even breakage thereof. A description of one preferred such method is set forth below with reference to FIG. 3.

Here an assembly 30, depicted in dissembled form, includes upper and lower electrodes 32 and 34 respectively. These electrodes are for creating a discharge in the ceramic tubes 14 and 16, when, of course, there is lasing gas in the ceramic tubes and RF-power applied to the electrodes. In this arrangement it is intended that electrode 32 would be the live or "hot" and electrode 34 the ground electrode. A ceramic plate 48 provides insulation of the hot electrode from a laser housing, which is discussed in detail further herein below.

Electrodes 32 and 34 are furnished with grooves corresponding to the shape and orientation of the ceramic tubes. In electrode 34 parallel grooves 36 are configured to receive ceramic tubes 14 and an angled groove 38 is configured to receive ceramic tube 16. There are corresponding grooves (not visible) in raised portions 40 of electrode 32.

In one method of completing assembly 30, the ceramic tubes are placed in the corresponding grooves in electrode 34; electrode 32 is set with grooves therein in contact with the ceramic tubes; then the electrodes joined by inductances 42, with screws 44A engaging threaded holes 46A in electrode 34, and screws 44B engaging threaded holes 46B in electrode 32. Inductances 42 provide for homogenizing a discharge created by the electrodes, as is known in the art.

The ceramic-tube sub-assembly can be held together in a laser housing with tubes maintained in alignment by spring pressure applied to electrode 32, with electrode 34 resting on a base of the housing. Alternatively, inductances 42 can be formed as coil springs, made for example from phosphor-bronze. These springs can be stretched while screwing the springs to the electrodes, and then released to allow the coil spring tension to urge the electrodes toward each other, and grip the ceramic-tube assembly. This has an advantage that completion of the electrode and ceramic tube assembly can be made independent of an operation of installing the electrodes and ceramic tubes in a housing.

Figure 4:
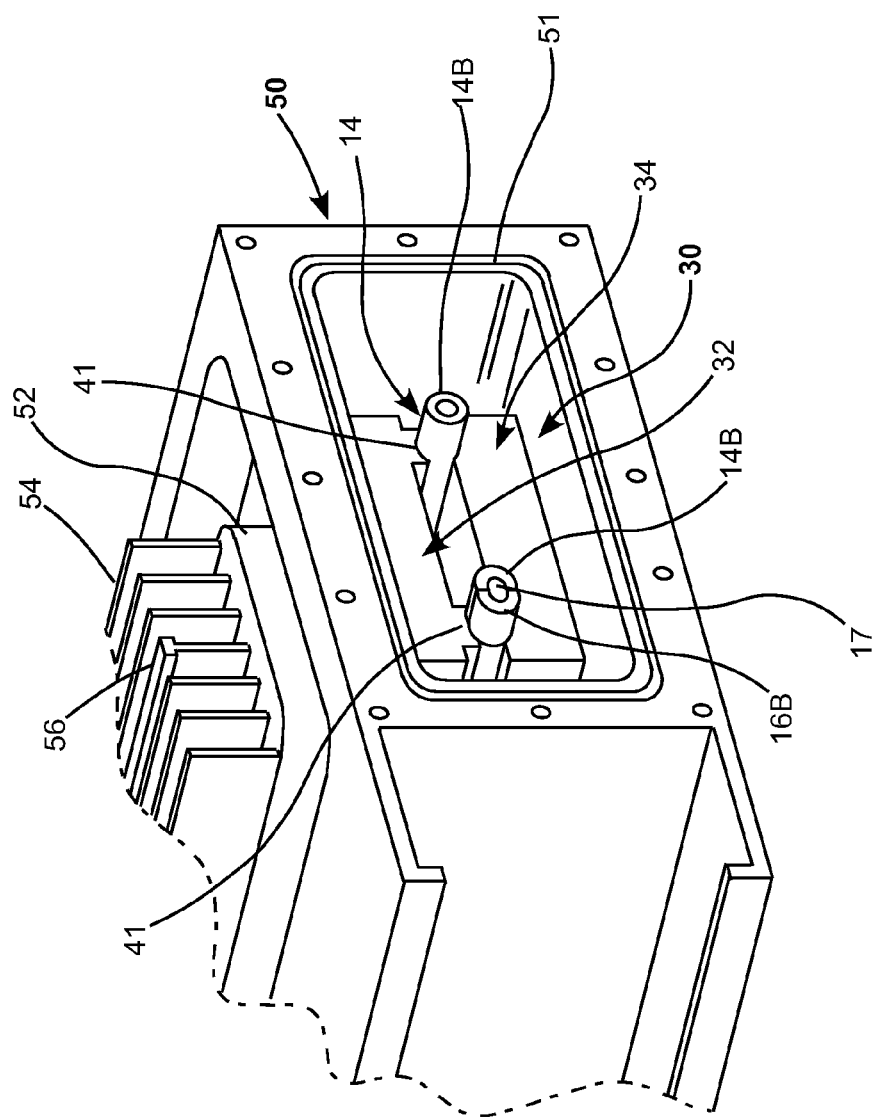
FIG. 4 is a fragmentary three-dimensional view schematically illustrating detail of the assembly of ceramic tubes and electrodes of FIG. 3 in one example of a laser-housing.

FIG. 4 schematically illustrates one example of above-described ceramic tube and electrode assembly 30, located in a laser housing 50. Housing 50 is hermetically sealable by an end plate (not shown) via a gasket or O-ring (not shown) in a corresponding groove 51. The end plate would typically include hermetically sealed mounts for the resonator mirrors. A description of one example of such mirror-mounts is provided in above-referenced U.S. Pat. No. 6,192,061.

In FIG. 4, grooves 41 can be seen in corresponding raised portions of electrode 34. The raised portions provide that there is sufficient space between the electrodes, where the electrodes are not in contact with the ceramic tubes, to prevent spurious arcing between the electrodes when RF-power is applied thereto. A preferred height of the raised portions is between about 0.2 inches and about 0.4 inches.

Figure 5:
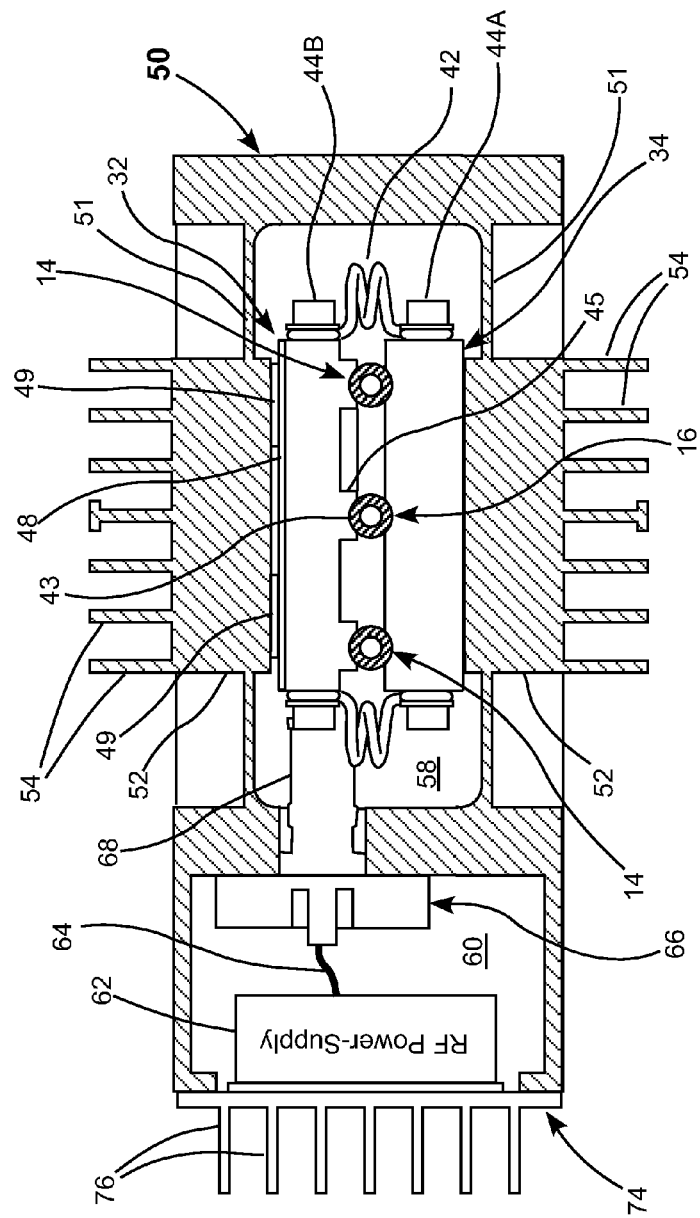
FIG. 5 is a longitudinal cross-section view seen midway along the laser-housing of FIG. 4, schematically illustrating further detail of the assembly of ceramic tubes and electrodes in the laser-housing.

Further detail of housing 50 is depicted in the longitudinal cross-section view of FIG. 5. Here the cross-section is taken at a point midway along the length of housing 50 of FIG. 4, such that a groove 43 for accepting ceramic tube 16, in a raised portion 45 of electrode 32 is visible. The groove and corresponding raised portion extend diagonally across electrode 32.

Housing 50 includes two separate compartments 58 and 60. Compartment 58 houses the ceramic tube and electrode assembly and the laser resonator, and contains the lasing gas, which of course, is also in the ceramic tubes. Web-like or diaphragm portions 51 of the housing enclosing compartment 58 provide for some flexibility in the housing to accommodate differential expansion stresses. A detailed description of this aspect of the housing is provided in U.S. Patent Publication 2009/0213885, assigned to the assignee of the present invention, and the complete disclosure of which is hereby incorporated herein by reference. Bulk portions 52 of the housing serve as diffusion-cooling members of the housing. In FIG. 5 cooling members 52 are equipped with cooling-fins 54. Alternatively, the diffusion-cooling members can be water-cooled.

The sub-assembly of ceramic tubes 14 and 16 can be held together by spring pressure provided by springs 49 compressed between the cooling member 52 of the housing and ceramic plate 48 which insulates hot-electrode 32 from the housing. Electrode 34 rests firmly on the base of the housing.

Further, as compartment 58 of the housing contains a lasing gas mixture at a sub-atmospheric pressure between about 30 to 100 Torr, and because of flexibility afforded by diaphragm-portions 51 of the housing, atmospheric pressure surrounding the housing will add to the spring pressure provide by springs 49, urging the electrodes together and thereby firmly holding the ceramic-tube and electrode assembly together. Depending on the thickness and flexibility of diaphragm section 51 it may be possible to rely only on the pressure difference between the inside and outside of the housing to urge the electrodes together.

Compartment 60 houses a RF power-supply (RFPS) 62. The RFPS is mounted on a plate 74, which is furnished with cooling fins 76. A short connection 64 connects the RFPS with an electrical feed-through 66. A connector 68 of the feed-through transfers the RF power to an about mid-way position on the side of electrode 32 facing the connector.

In conclusion, the present invention is described with reference to a preferred embodiment. The invention is not limited, however, to the embodiment described and depicted. Rather the invention is defined by claims appended hereto.

What is claimed is:

1. A gas discharge laser, comprising:
   a laser housing including a lasing gas;
   a plurality of independent dielectric waveguide tubes located in the laser housing and filled with the lasing gas, with adjacent ones of the dielectric tubes thereof at an acute angle to each other, and with ends of the adjacent ones thereof being cut to define a taper and fitted together to form a common aperture;
   first and second electrodes located in the housing and arranged to create a gas discharge in the lasing gas in the dielectric tubes when electrical power is applied to the electrodes; and
   a plurality of mirrors arranged to form a laser-resonator having a longitudinal axis extending through the plurality of dielectric tubes.

2. The laser of claim 1, wherein there are three dielectric tubes fitted together in a Z-shape.

3. The laser of claim 2, wherein the angle between adjacent ones of the dielectric tubes is between about two degrees and about ten degrees.

4. The laser of claim 1, wherein the electrodes are spaced apart and parallel to each with the dielectric tubes therebetween and in corresponding grooves in the electrodes.

5. The laser of claim 4, wherein the dielectric tubes are held fitted together by spring force urging the electrodes toward each other.

6. The laser of claim 5, wherein the second electrode rests on a base of the housing and the spring force is applied to the upper electrode by one or more springs compressed between the first electrode and the housing.

7. The laser of claim 5, wherein there is a plurality of inductance coils in the form of tensioned springs spaced apart along opposite sides the electrodes, each thereof connecting the first electrode to the second electrode such that the spring tension provides the spring force urging the electrodes toward each other.

8. The laser of claim 4, wherein the interior of the housing is at a sub-atmospheric pressure and the housing and electrodes are configured and arranged such that the housing applies pressure to the electrodes due to atmospheric pressure outside the housing, thereby holding the dielectric tubes fitted together.

9. A gas discharge laser, comprising:
   a laser housing including a lasing gas;
   a plurality of independent dielectric waveguide tubes located in the laser housing and filled with the lasing gas, with adjacent ones of the dielectric tubes thereof at an acute angle to each other, and with ends of the adjacent tubes being cut to define a taper and fitted together to form a common aperture;
   first and second electrodes located in the housing and arranged to create a gas discharge in the lasing gas in the dielectric tubes when electrical power is applied to the electrodes, the electrodes being further arranged to hold the plurality of dielectric tubes in alignment with each other; and
   a plurality of mirrors arranged to form a laser-resonator having a longitudinal axis extending through the plurality of dielectric tubes.

10. The laser of claim 9, wherein there are three dielectric tubes arranged in a Z-shape.

11. The laser of claim 10, wherein the angle between adjacent ones of the dielectric tubes is between about two degrees and about ten degrees.

12. The laser of claim 9, wherein the electrodes are spaced apart and parallel to each with the dielectric tubes therebetween and in corresponding grooves in the electrodes.

13. The laser of claim 12, wherein the dielectric tubes are held fitted together by spring force urging the electrodes toward each other.

14. A gas laser comprising:
   a gas tight housing;
   a pair of spaced apart, elongated electrodes;
   a folded waveguide positioned between the electrodes, said waveguide being formed from at least three independent tubular dielectric waveguide segments, two of said segments being oriented parallel to each other and parallel to the side edges of the electrodes and with at least one the said segments being located between said two segments and at non-normal angle thereto and with the ends of adjacent tubular segments being cut to define a taper and fitted together to form a common aperture; and
   an optical resonator defined by a plurality of minors including at least two end minors, said optical resonator including at least two fold mirrors being positioned at the opposed ends of said at least one segment for folding the laser radiation emerging from said one segment back into an adjacent segment.

15. The laser as recited in claim 14, wherein one of said electrodes includes a plurality of grooves for seating and aligning said tubular segments.

16. The laser as recited in claim 15, wherein the other of said electrodes including a plurality of projections, each projection including a groove for holding an aligning the tubular segments.

* * * * *